United States Patent
Strock

(10) Patent No.: US 8,522,904 B2
(45) Date of Patent: Sep. 3, 2013

(54) HOOD MOUNTED BATTERY SET PLATE

(75) Inventor: Nicky Strock, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 12/976,055

(22) Filed: Dec. 22, 2010

(65) Prior Publication Data

US 2012/0160582 A1 Jun. 28, 2012

(51) Int. Cl.
 *H01M 4/70* (2006.01)
 *H01M 2/10* (2006.01)

(52) U.S. Cl.
 CPC .................................. *H01M 2/1083* (2013.01)
 USPC ....................................................... 180/68.5

(58) Field of Classification Search
 CPC .............................. B60R 16/04; H01M 2/1083
 USPC ............................ 180/68.5; 29/428; 439/34
 See application file for complete search history.

(56) References Cited

U.S. PATENT DOCUMENTS

| | | | | |
|---|---|---|---|---|
| 1,399,702 | A * | 12/1921 | Eaton | 429/100 |
| 1,459,973 | A * | 6/1923 | Colgan | 180/68.5 |
| 2,551,990 | A * | 5/1951 | Wills | 429/96 |
| 3,165,163 | A | 1/1965 | Holka | |
| 4,696,508 | A * | 9/1987 | Brautigam | 296/65.05 |
| 5,082,075 | A | 1/1992 | Karolek et al. | |
| 5,228,531 | A | 7/1993 | Patterson et al. | |
| 5,542,489 | A | 8/1996 | Allison et al. | |
| 5,823,502 | A | 10/1998 | Greiner et al. | |
| 6,186,256 | B1 * | 2/2001 | Dignitti | 180/68.5 |
| 7,350,610 | B2 * | 4/2008 | Kikuchi | 180/68.5 |
| 7,993,155 | B2 * | 8/2011 | Heichal et al. | 439/374 |

FOREIGN PATENT DOCUMENTS

DE 4138834 5/1993

* cited by examiner

*Primary Examiner* — John R Olszewski
*Assistant Examiner* — Brian Cassidy
(74) *Attorney, Agent, or Firm* — Rankin, Hill & Clark LLP

(57) ABSTRACT

A battery mounting arrangement for a vehicle includes a compartment (e.g., an engine compartment), a cover disposed over the compartment (e.g., a hood disposed over an engine compartment) and a spring mounted set plate mounted to the cover for applying a hold down force on an associated battery mounted in the compartment.

17 Claims, 9 Drawing Sheets

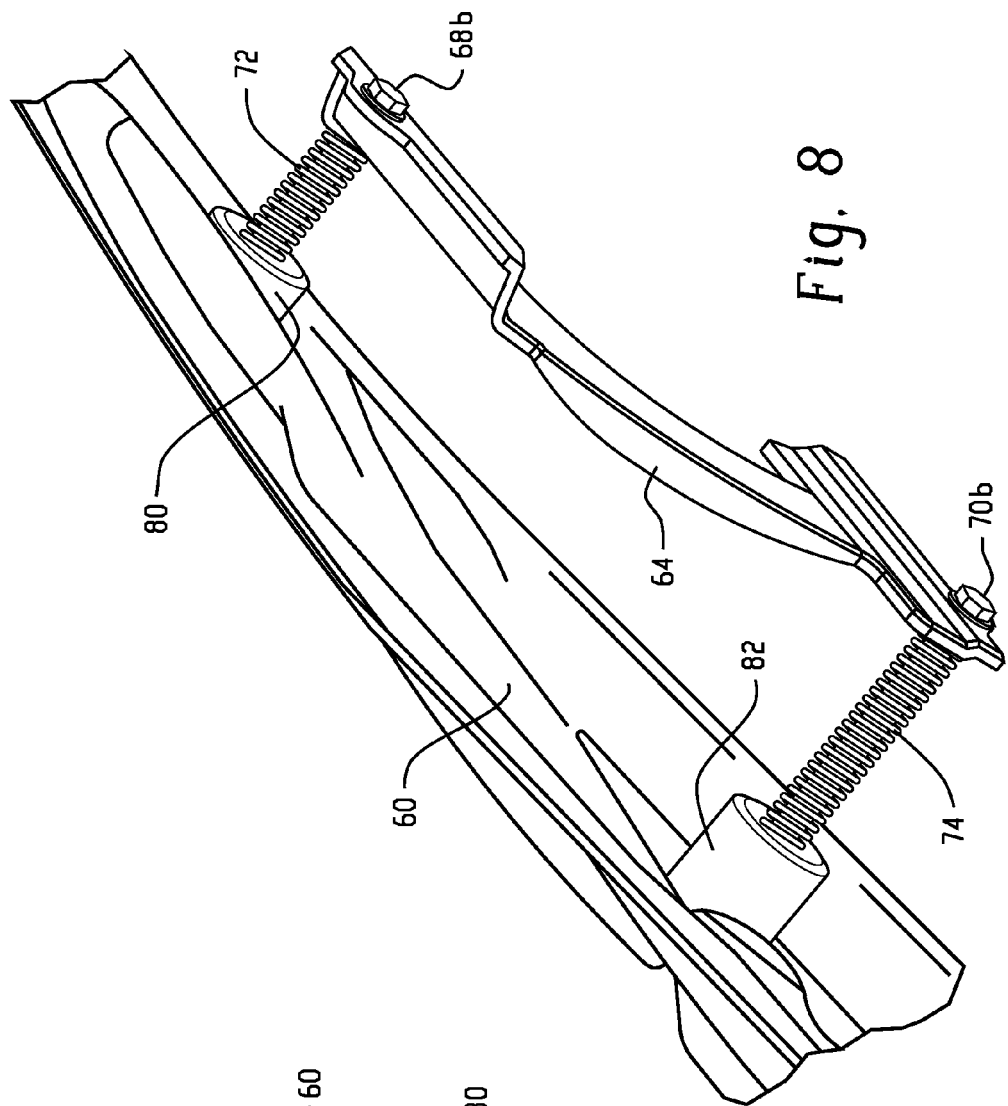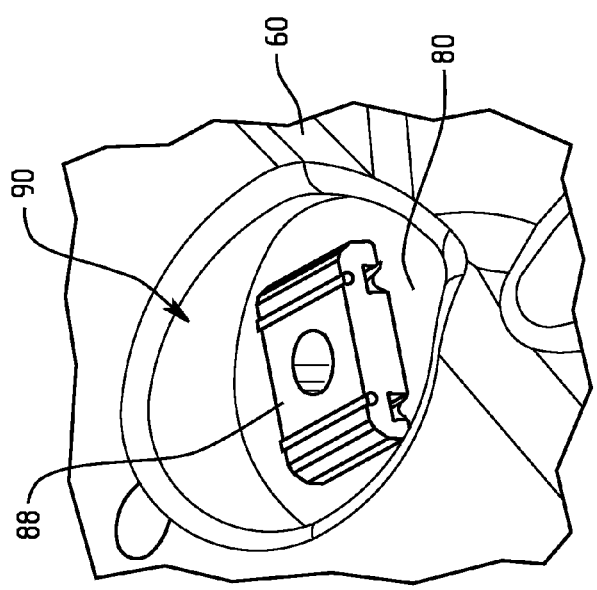

US 8,522,904 B2

HOOD MOUNTED BATTERY SET PLATE

BACKGROUND

The present disclosure generally relates to a battery mounting arrangement for a vehicle, and more particularly relates to a battery mounting arrangement having a hood mounted battery set plate.

Batteries can be mounted in vehicles using a holding or set plate and one or more J-bolts. For example, the battery can be held by one or more J-bolts having a lower end or ends that are hooked through corresponding apertures disposed on the vehicle body or some intermediate component interposed between the battery and the vehicle body. Upper ends of the one or more J-bolts can be threaded and received through apertures defined in the set plate. Threaded members, such as nuts, can secure the threaded ends of the one or more J-bolts to the set plate. This secures the battery to the vehicle body and prevents movement of the battery within the engine compartment of the vehicle. While being inexpensive, these types of battery tie-downs can be difficult to assemble during installation or maintenance due to cramped work space around the battery. This can result in tedious and time-consuming processes for both automotive manufacturing plants and service stations.

SUMMARY

According to one aspect, a battery mounting arrangement for a vehicle includes a compartment, a cover disposed over the compartment and a spring mounted set plate mounted to the cover for applying a hold down force on an associated battery mounted in the compartment.

According to another aspect, a battery mounting assembly for securing a battery within an engine compartment of a vehicle includes a vehicle body portion for supporting the battery within the engine compartment. A hood is disposed over the engine compartment. The hood is movable between a closed position wherein the hood closes the engine compartment and an open position wherein access is provided to the engine compartment. A set plate is mounted to the hood on an underside thereof. The set plate is urged toward an extended position wherein the set plate applies a hold down force to the battery to secure the battery to the vehicle body portion when the hood is in the closed position.

According to a further aspect, a method for securing a battery in a vehicle is provided. In the method according to this aspect, a spring mounted set plate mounted to an underside of a hood of the vehicle is provided. The battery is set on a vehicle body support portion disposed within an engine compartment of the vehicle. The support portion is aligned with the spring mounted set plate when the hood of the vehicle is in a closed position. To secure the battery, the hood of the vehicle is closed. With the hood in the closed position, the spring mounted set plate applies a hold down force on an upper side of the battery.

BRIEF DESCRIPTION OF THE DRAWINGS

FIG. 5 is a partial perspective view showing a fastener of the set plate mounting arrangement secured to the hood for securing the set plate to the hood.

FIG. 8 is a perspective view showing the set plate mounted to an underside of the hood.

DETAILED DESCRIPTION

Figure 1:
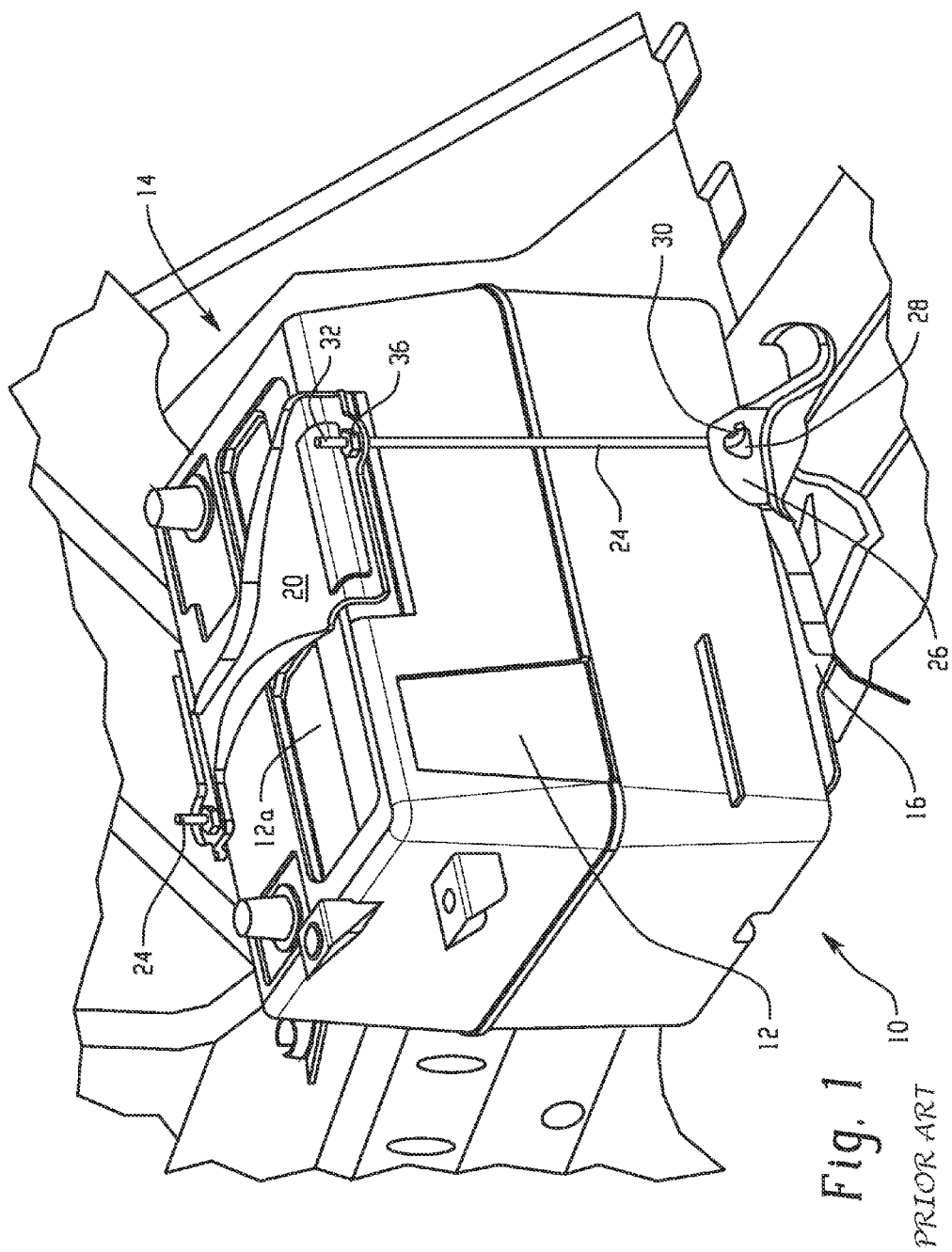
FIG. 1 is a perspective view of a battery mounting arrangement for a vehicle.
Figure 2:
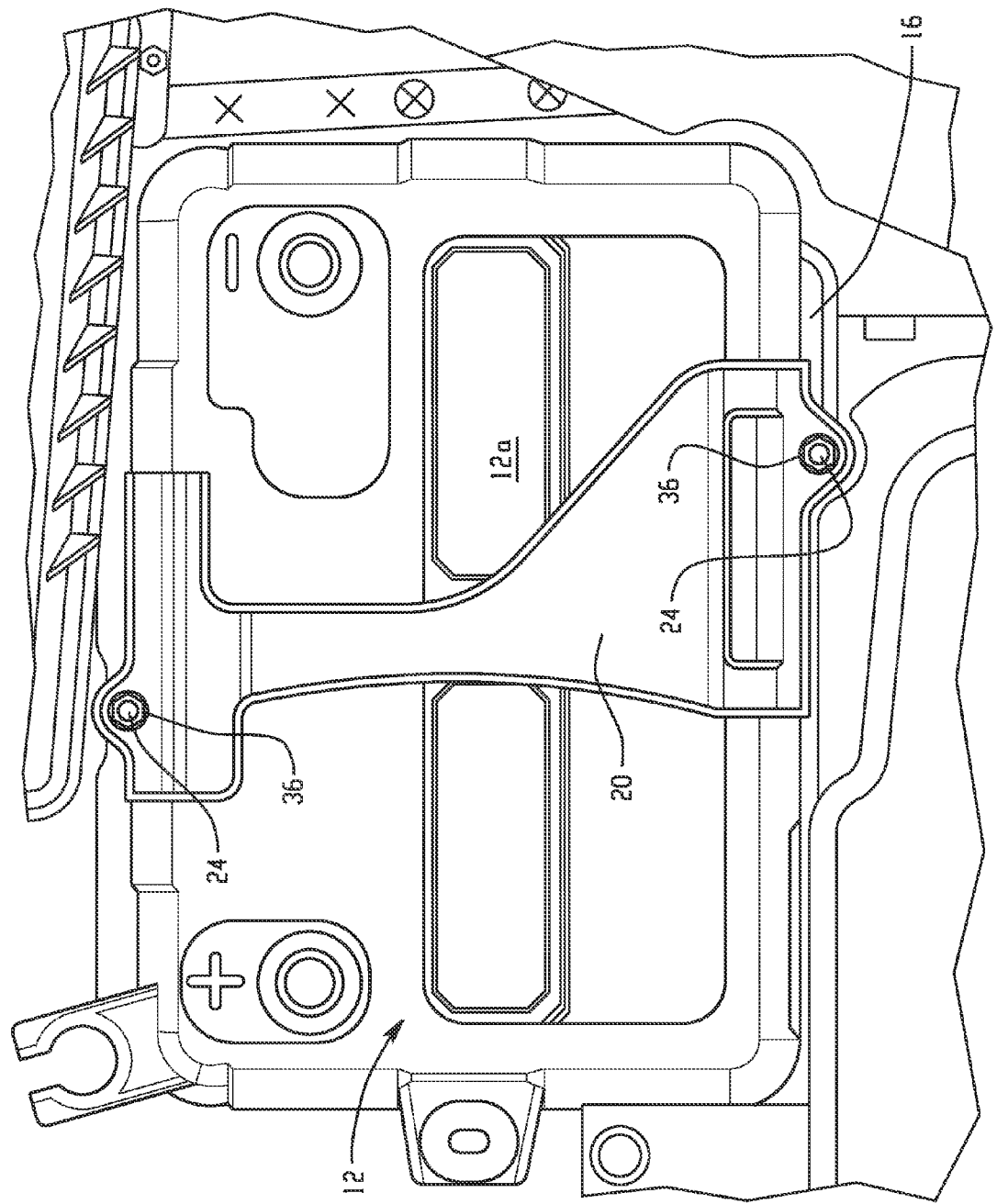
FIG. 2 is a top plan view of the battery mounting arrangement of FIG. 1.

Referring now to the drawings wherein the showings are for purposes of illustrating one or more exemplary embodiments and not for purposes of limiting same, FIGS. 1 and 2 illustrate a known battery mounting arrangement for a vehicle generally indicated by reference numeral 10. In this known arrangement 10, a battery 12 is secured within an engine compartment 14 of the vehicle. In particular, the battery 12 is secured on a vehicle body portion 16 of the vehicle that is disposed within the engine compartment 14. The vehicle body portion 16 can be a portion or member of the vehicle body forming a mounting surface on which the battery 12 can be placed. In the illustrated embodiment, the vehicle body portion 16 is a tray-shaped member secured, such as by welding, to other components of the vehicle body disposed within or forming the engine compartment 14.

To secure the battery 12 to the vehicle body portion 16, a plate 20 spans across a top side 12a of the battery 12. At opposite sides of the battery 12, the plate 20 is secured to the vehicle body portion 16 by a pair of fasteners, which are J-bolts 24 in the illustrated embodiment. In particular, as shown, the vehicle body portion 16 can include upstanding flange portions 26 (only one flange portion 26 shown in FIG. 1) having apertures 28 (only one aperture 28 shown in FIG. 1). Each of the J-bolts 24 can have a hooked end 30 received through the aperture 28 and a threaded end 32 received through a corresponding aperture (not shown) defined in the plate 20. A threaded member, such as the illustrated nut 36, can be threadedly received on the threaded end 32 of the J-bolt 24. When both J-bolts 24 are secured by nuts 36, the set plate 20 provides a sufficient hold down force against the top side 12a of the battery 12 for securing the battery 12 to the vehicle body portion 16.

By this arrangement, the battery 12 is held by two J-bolts 24 having lower hooked ends 30 hooked through corresponding apertures 28 disposed on the vehicle body portion 16, and particularly the flanged portions 26 thereof. The nuts 36 secure the threaded ends 32 of the J-bolts 24 to the plate 20. While being relatively inexpensive, this type of battery tie-down can be difficult to assemble during initial installation (e.g., at a manufacturing facility) or maintenance (e.g., at a service station), particularly when there is minimal work space around the battery 12. Also, the illustrated mounting arrangement 10 relies on a blind assembly procedure to secure the battery 12 within the vehicle. This can be tedious and time-consuming for both the vehicle manufacturer and service stations (or other maintenance providers).

Figure 3:
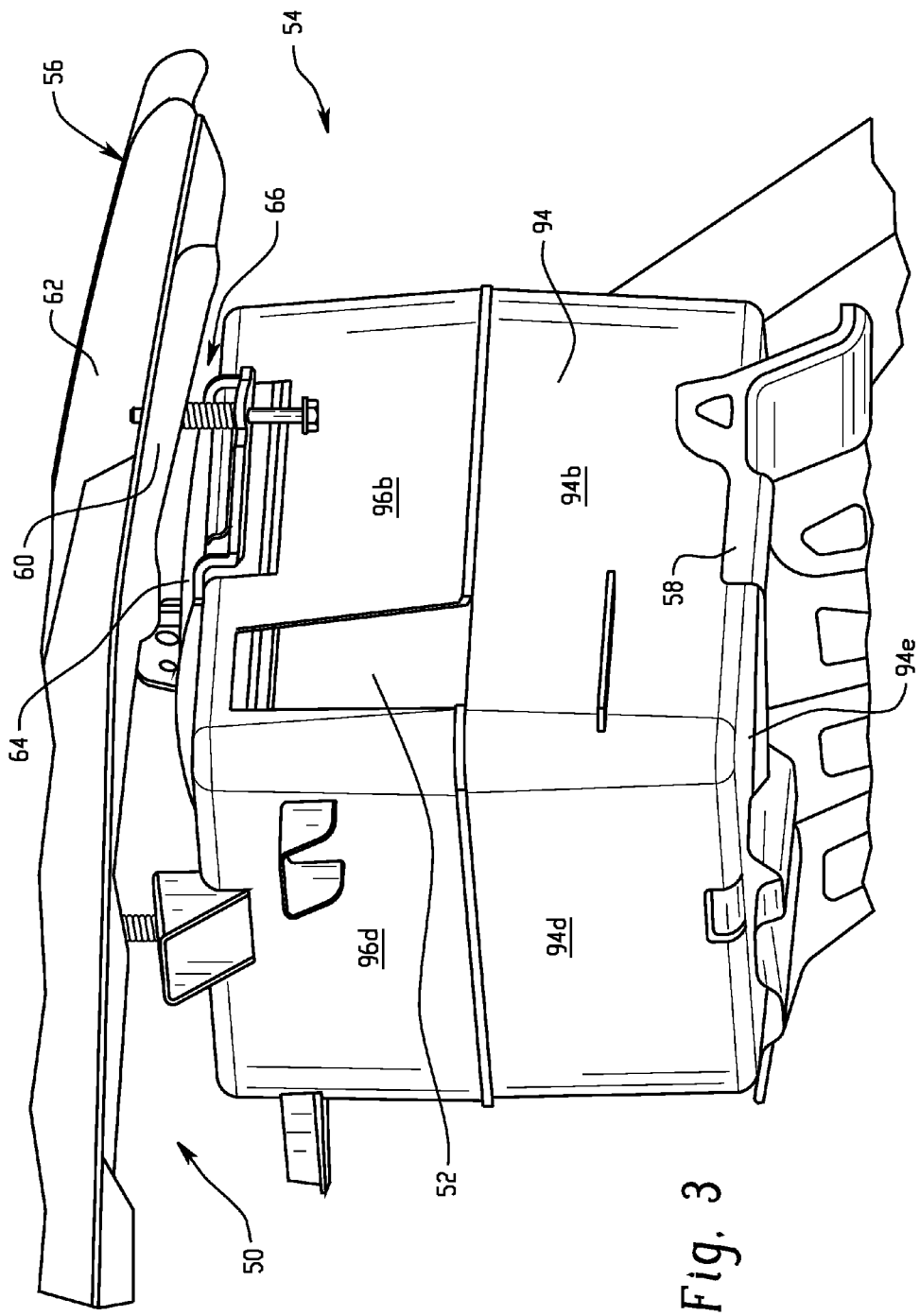
FIG. 3 is a perspective view of an improved battery mounting arrangement for a vehicle having a spring mounted set plate mounted to an underside of the vehicle's hood.

With reference now to FIG. 3, an improved battery mounting arrangement or assembly 50 is illustrated for securing a battery 52 within a compartment 54 of a vehicle. As will be described in more detail below, the battery mounting arrangement 50 can include a cover 56 disposed over the compartment 54, a mounting structure 58 to which the battery 52 is secured and a spring mounted set plate 64 mounted to the cover 56 for applying a hold down force on the battery 52 mounted in the compartment 54. In the illustrated embodiment, the compartment 54 is an engine compartment of the vehicle and the cover 56 is a hood disposed over the engine compartment 54. It should be noted, however, that the battery 52 and the battery mounting arrangement 50 therefor can be located in other compartments of the vehicle and/or the cover can be some other closure or component in the vehicle, while keeping within the scope and spirit of the present disclosure. For example, some vehicles include a battery in a compartment behind or underneath rear passenger seats or in a cargo space/area of the vehicle.

The mounting structure 58 can be a vehicle body portion disposed within the engine compartment 54 for supporting the battery 52. In the illustrated embodiment, the vehicle body portion 58 can be the same or similar as the vehicle body portion 16 of FIGS. 1 and 2, though this is not required. The hood 56, which can include a hood frame 60 and a hood skin 62, is movable between a closed position (shown in FIG. 3) wherein the hood 56 closes the engine compartment 54, and an open position (shown in FIG. 9) wherein access is provided to the engine compartment 54. As will be described in more detail below, the battery mounting assembly 50 can further include a spring mounted set plate 64 mounted to the hood 56 by a set plate mounting arrangement 66 for applying a hold down force on the battery 52 mounted in the engine compartment 54.

More particularly, the set plate 64, which can also be referred to as a plate member, can be mounted to the hood 56 on an underside thereof, such as to the hood frame 60. The set plate 64 is urged toward an extended position wherein the set plate 64 applies a hold down force to the battery 52 to secure the battery 52 to the vehicle body portion 58 when the hood 56 is in the closed position. Accordingly, the set plate 64 applies the hold down force to the battery 52 when the hood 56 is in the closed position to secure the battery 52 within the engine compartment 54, and the set plate 64 is moved apart from the battery 52 when the hood 56 is in the open position allowing the battery 52 to be removed form the engine compartment 54.

Figure 4:
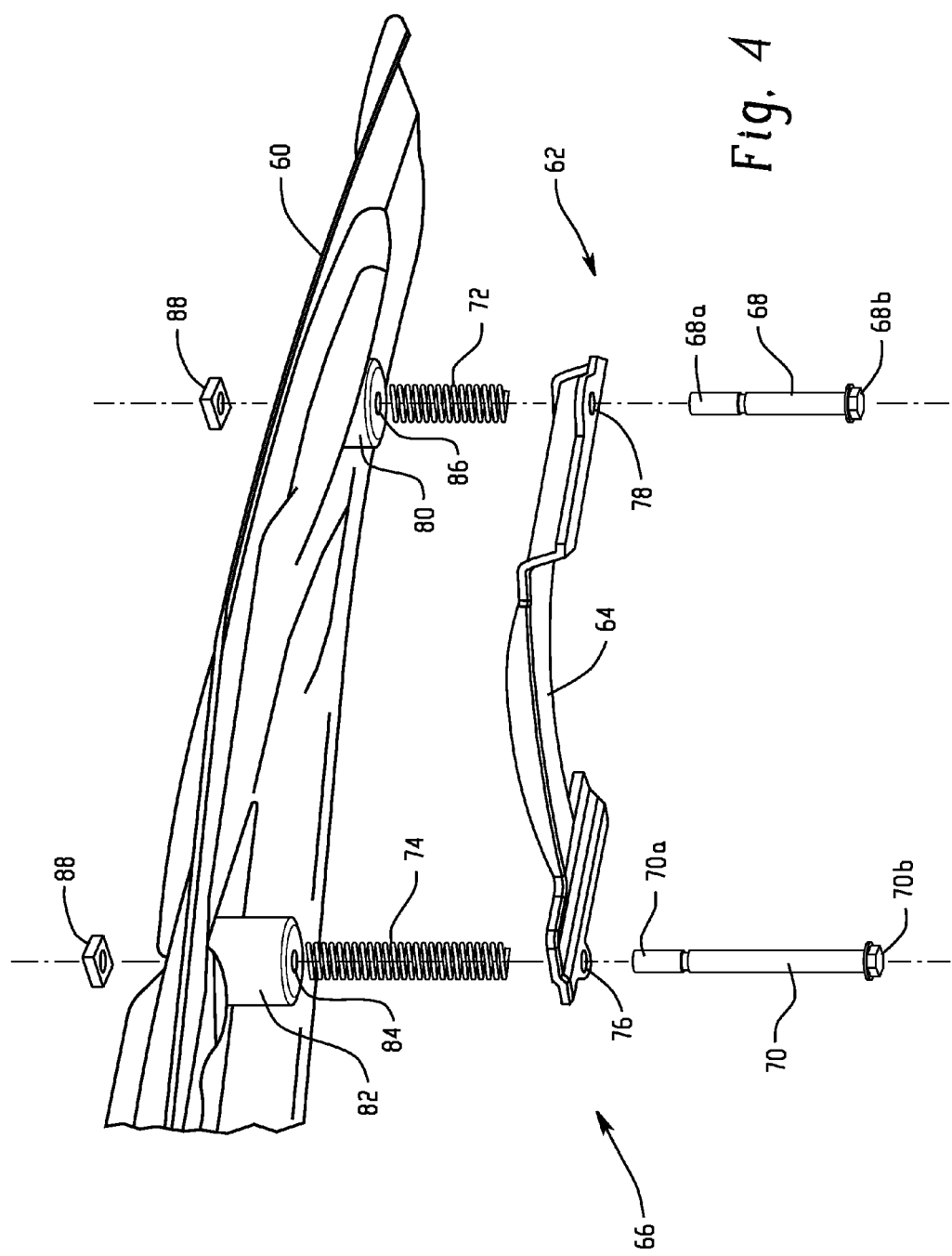
FIG. 4 is an exploded perspective view of a mounting arrangement for the spring mounted set plate.

With additional reference to FIG. 4, the set plate mounting arrangement 66 includes the set plate 64 for applying the hold down force to an upper surface 52a (FIG. 9) of the battery 52, at least one pin member and at least one spring. As will be described in more detail below, each at least one pin member can have a first end fixably secured to the hood 56 and a second end slidably received through an aperture in the set plate 64 for sliding movement relative thereto, and each at least one spring can be interposed between the set plate 64 and the hood 56 for urging the set plate 64 away from the hood 56 and toward the second end of the at least one pin member. In the illustrated embodiment, the at least one pin member is a pair of pin members 68, 70 securing the set plate 64 to the hood 56. The set plate 64 is movable along the pin members 68, 70 between an extended position and a retracted position. The at least one spring is interposed between the set plate 66 and the hood 56 urging the set plate 66 toward the extended position along the pins 68, 70.

In particular, in the illustrated embodiment, each pin 68, 70 is a bolt, such as a shoulder bolt. Accordingly, first ends 68a, 70a of the bolts 68, 70 are threaded and second ends 68b, 70b of the bolts 68, 70 are configured as bolt heads that limit slideable movement of the set plate 64. Arranged relative to the battery 52, the first and second pin members 68, 70 are disposed at opposite sides of the battery 52. The at least one spring of the battery mounting assembly 50 can include a first spring 72 and a second spring 74. Each spring 72, 74 can be a coil spring radially received around the corresponding pin 68, 70 between the first and second ends 68a, 68b and 70a, 70b of the pins 68, 70. Accordingly, the first spring 72 is annularly disposed on the first pin 68 of the pair of pins 68, 70 and the second spring 74 is annularly disposed on the second pin 70 of the pair of pin members 68, 70. When configured as bolts, head portions 68b, 70b of the pins 68, 70 prevent the set plate 64 from being removed from or forced off the pair of pin members 68, 70.

To assemble, the threaded ends 68a, 70a are inserted through apertures 76, 78 defined in the set plate 64 at opposite ends thereof. In particular, in the illustrated embodiment, the apertures 76, 78 are disposed at longitudinally opposite ends of the set plate 64 and opposite lateral ends of the set plate 64 (i.e., the apertures 76, 78 are cater-corner relative to one another). After receipt through the apertures 76, 78, the pins 68, 70 are inserted into structures 80, 82 (e.g., structural cylinder portions) formed as part of the hood frame 60 on the underside of the hood 56. By having different sizes, the cylinder portions 80, 82 can allow the pins 68, 70 to be positioned vertically in alignment with one another even when the hood frame 60 has an elevating underside profile. (i.e., the underside of the hood frame 60 is elevated or raised adjacent the protrusion 82 as compared to the protrusion 80).

The cylinder portions 80, 82 have apertures 84, 86, respectively, defined therein for receipt of the threaded ends 68a, 70a of the pins 68, 70. With additional reference to FIG. 5, fasteners (e.g., twist-on wire connectors) 88 can be received within a recessed portion 90 of the structures 80, 82 (only one fastener 88 is shown received in recessed portion 90 of structure 80 in FIG. 5). In the illustrated embodiment, the fastener 88 can be pressed to the hood frame 60 for attachment thereto such as is known by those skilled in the art (e.g., the same or similar to when hood dampers are applied to hood frames). The fasteners 88 can be threaded members that threadedly engage the threaded ends 68a, 70a of the pins 68, 70 allowing the pins 68, 70 to be secured to the hood frame 60. Once so engaged, the set plate 64 and the springs 72, 74 are trapped between the head portions 68b, 70b of the pins 68, 70 and the structures 80, 82 of the hood frame 60.

Figure 6:
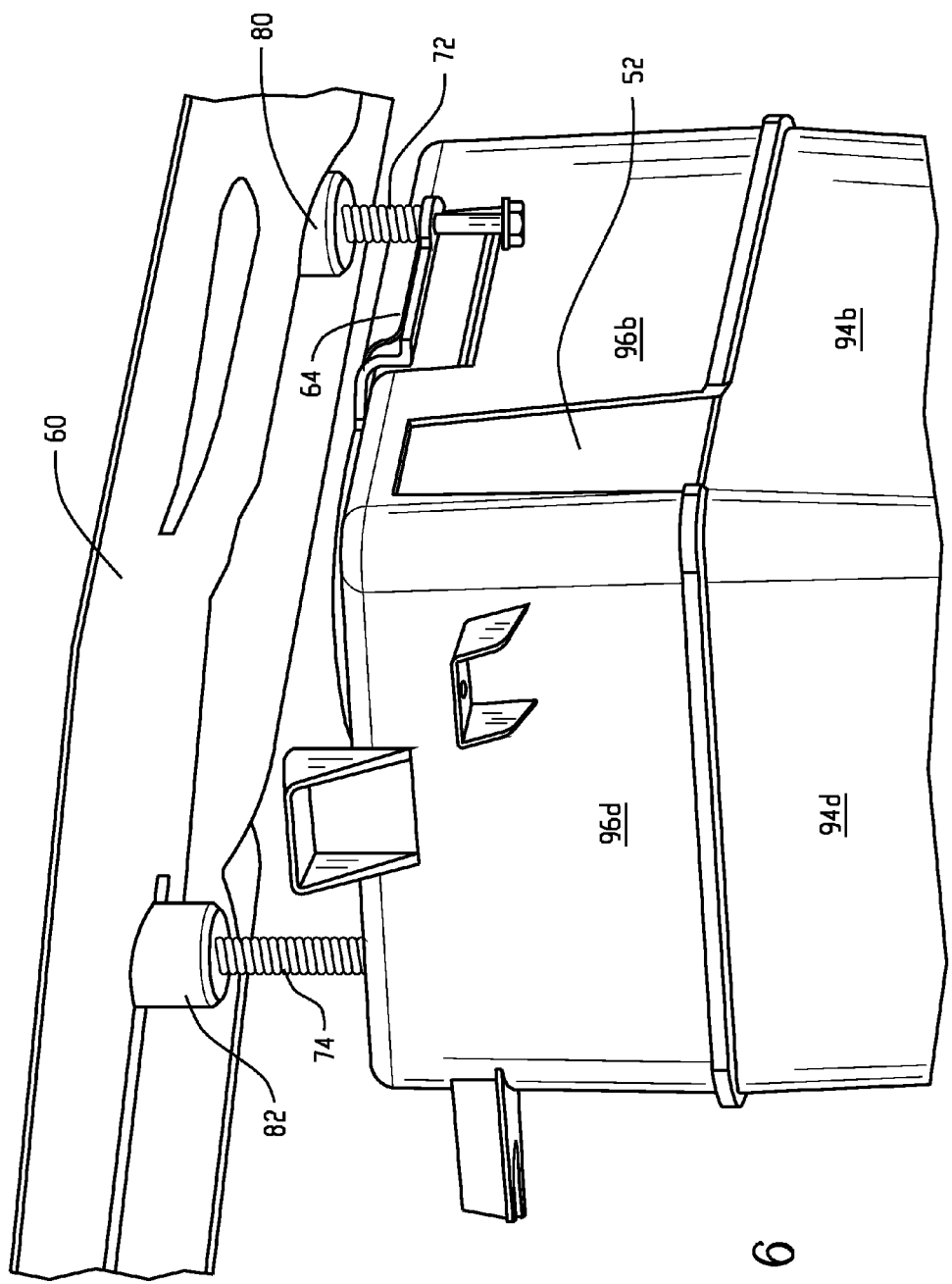
FIG. 6 is a partial perspective view of the battery mounting arrangement of FIG. 3 primarily showing a front bolt and spring of the set plate mounting arrangement applying a hold down force.
Figure 7:
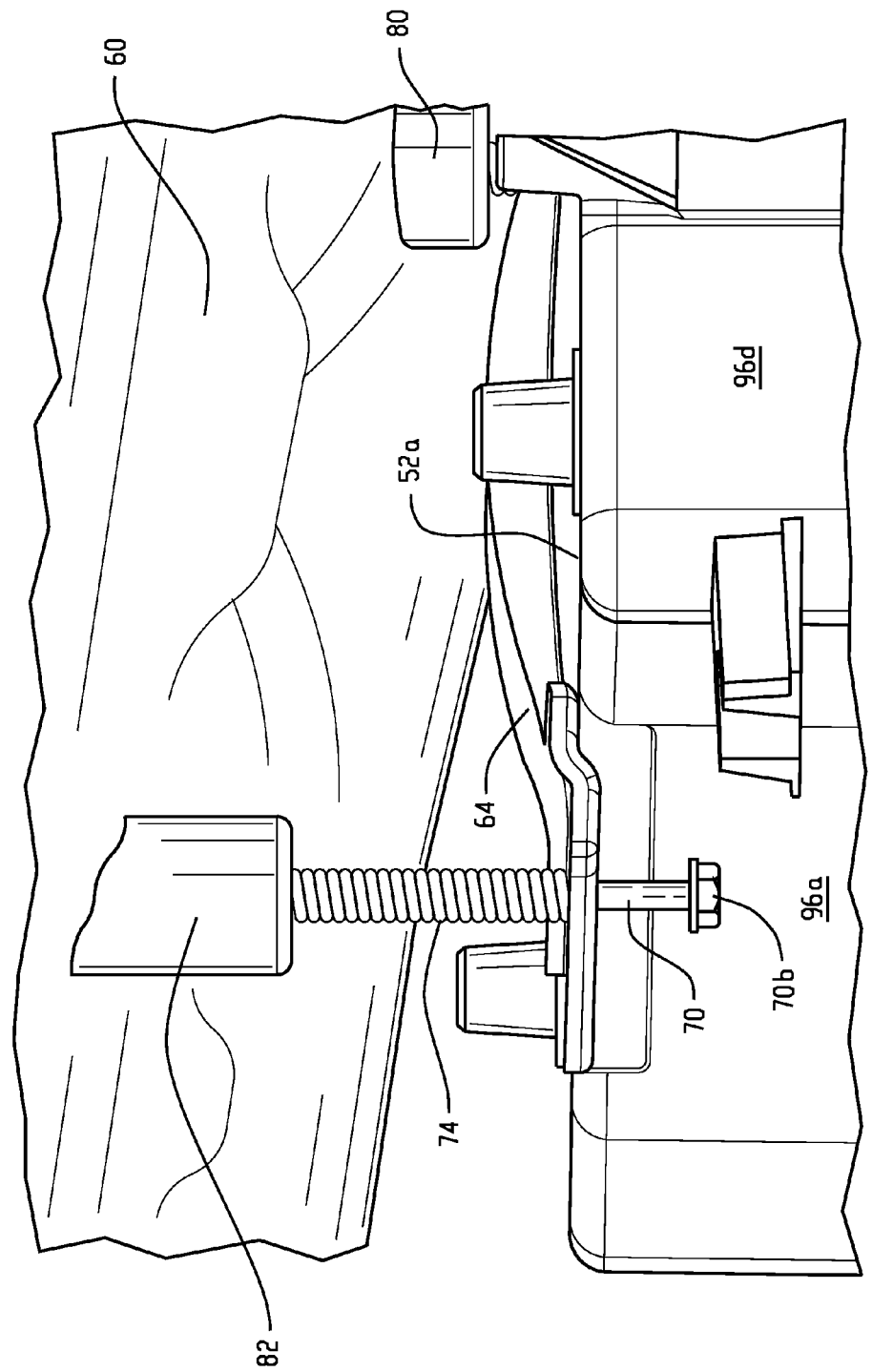
FIG. 7 is a partial perspective view of the battery mounting arrangement of FIG. 3 showing a rear bolt and spring of the set plate mounting arrangement also applying a hold down force.

With additional reference to FIGS. 6, 7, and 8, the pins 68, 70 can be of varying lengths. For example, as illustrated, the pin 68 can be relatively shorter than the pin 70 for accommodating varying distances between the battery 52 and the hood frame 60, particularly the protruding structures 80, 82 thereof. Likewise, in the illustrated embodiment, the spring 72 can be relatively shorter than the spring 74. Using pins and springs of varying lengths relative to one another can allow a substantially similar hold down force to be applied to the set plate 64 and ultimately to the battery 52 by the springs 72, 74 even when varying distances between the top side 52a of the battery 52 and the underside of the hood 56 and the hood frame 60 and/or to the structures 80, 82 are present.

Figure 9:
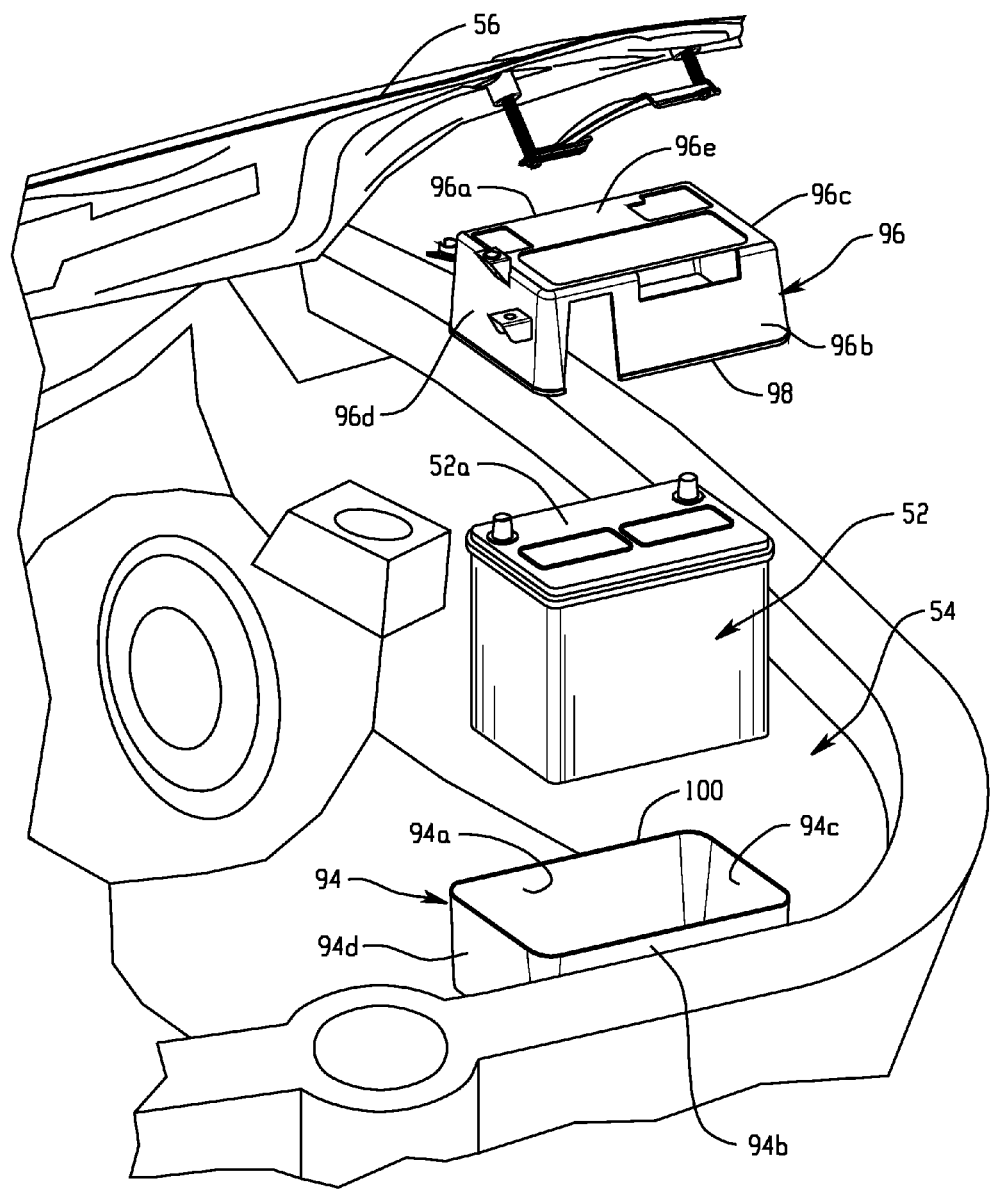
FIG. 9 is a partial exploded view of the battery mounting arrangement of FIG. 3.

With further reference to FIG. 9, the battery mounting arrangement 50 can additionally include a movement control apparatus that limits at least one of longitudinal or lateral movement of the battery 52 within the engine compartment 54. In the illustrated embodiment, the movement control apparatus is or includes a battery tray 94 mounted to the vehicle body portion 58 for receiving the battery 52 that limits both longitudinal and lateral movement of the battery 52 within the engine compartment 54. The battery tray 94 can include at least one upstanding lateral wall (e.g., walls 94a, 94b) for limiting lateral movement of the battery 52 and at least one upstanding longitudinal wall (e.g., walls 94c, 94d) for limiting longitudinal movement of the battery 52. In the illustrated embodiment, the battery tray 94 is or is formed as a lower clam shell housing portion that encloses a lower portion of the battery 52. This lower clam shell housing 94 includes a base wall 94e (FIG. 3) upon which the battery 52 rests when installed in the engine compartment 54, spaced apart lateral walls 94a, 94b and spaced apart longitudinal walls 94c, 94d. As shown, the lateral and longitudinal walls 94a-d can complement a shape of the battery 92 (e.g., both can be rectangular).

The battery mounting assembly 50 can additionally include an upper clam shell housing portion 96 received over an upper portion of the battery 52 and enclosing the upper portion of the battery 52. As best shown in FIG. 3, the upper and lower clam shell housing portions 94, 96 can together enclose the battery 52. In particular, in the illustrated embodiment, the upper clam shell housing portion 96 can have spaced apart longitudinal walls 96a, 96b, spaced apart lateral walls 96c, 96d and an upper wall 96e received over an upper side of the battery 52. Like the walls of the lower clam shell housing portion 94, the lateral and longitudinal walls 96a-d of the upper clam shell housing portion 96 can complement a shape of the battery 52. Together, the upper and lower clam shell housing portions 94, 96 can form a battery housing that encases the battery 52.

The upper clam shell housing portion 96 and the lower clam shell housing portion 94 can be snap fit together. More specifically, in the illustrated embodiment, a lower lip 98 of the upper clam shell housing portion 96 can be structurally configured to snap fit onto an upper lip 100 of the lower clam shell housing portion 94. In this configuration, the upper clam shell housing portion 96 can snap connect to the lower clam shell housing portion 94 to releasably connect the upper and lower housing portions 94, 96. Of course, other releasable connections can be provided between the housing portions 94, 96.

Figure 10:
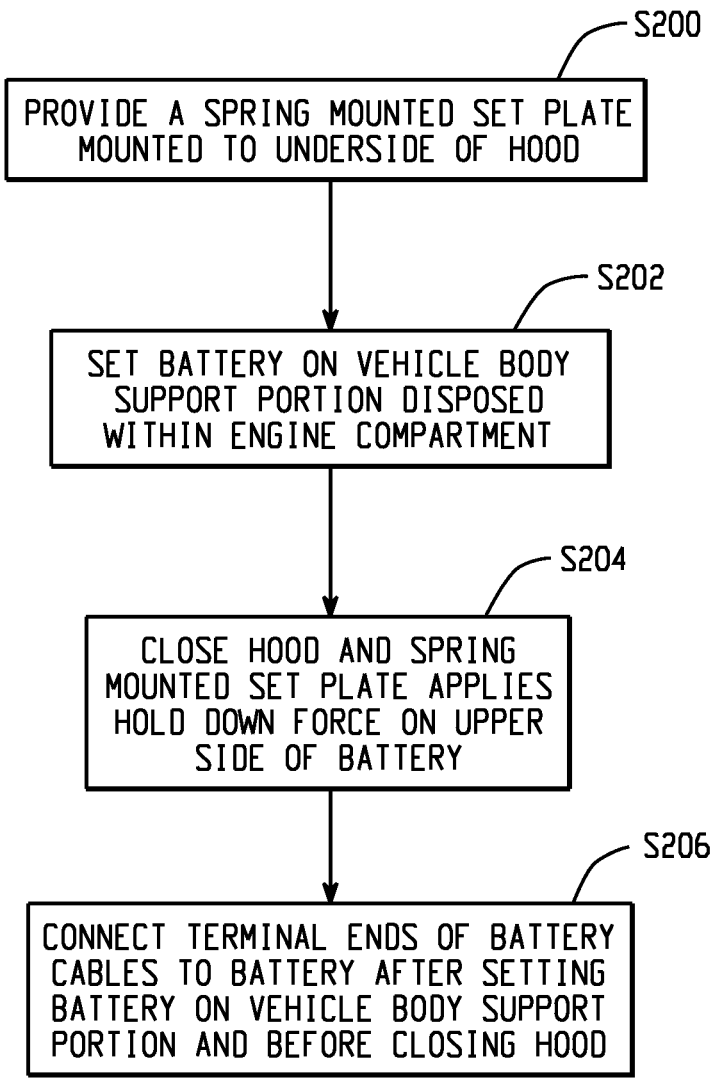
FIG. 10 is a process flow diagram of a method for securing a battery in a vehicle.

With reference now to FIG. 10, a method for securing a battery in a vehicle will now be discussed. In particular, the method of FIG. 10 will be discussed in reference to the embodiment illustrated in FIGS. 3-9, though it is to be appreciated that the method could be used in association with other battery mounting assemblies. In the method, a spring mounted set plate (e.g., set plate 64) that is mounted to the underside of a hood of a vehicle is provided (S200). A battery, such as battery 52, is set on a vehicle body support portion disposed within an engine compartment of a vehicle, such as vehicle body portion 58 of engine compartment 54 (S202).

Setting the battery on the vehicle support portion can include inserting a lower end of the battery in a battery tray disposed on the support portion, such as the battery tray 58 in the embodiment illustrated in FIGS. 3-9. The battery tray can include lateral and longitudinal walls for preventing lateral and longitudinal movement within the engine compartment. The support portion (e.g., support portion 58) can be aligned with the spring mounted set plate (e.g., plate 64) when the hood of the vehicle is in a closed position.

To secure the battery, the hood of the vehicle can be closed (S204). When the hood is closed, the spring mounted set plate applies a hold down force on an upper side of the battery. If desired, terminal ends of battery cables (not shown) can be connected to the battery after setting the battery on the vehicle support portion and before a closing of the hood of the vehicle when desired to electrically connect the battery within the vehicle (S206).

Advantageously, mounting the set plate to the hood eliminates the difficult install and removal procedure associated with prior mounting arrangements. In particular, when the hood is open, the battery can be easily removed after disconnecting the battery cables. Additionally, during manufacture of the vehicle, the battery can be easily installed without having to install or remove the battery set plate. However, and advantageously, battery movement is still controlled (to the extent desired) longitudinally and laterally by the battery tray.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A battery mounting arrangement for a vehicle, comprising:
   a compartment of the vehicle;
   a pivotable cover disposed over the compartment, the pivotable closure pivotable between a closed position wherein the pivotable cover closes the compartment and an open position wherein access is provided to the compartment; and
   a spring mounted set plate mounted to the pivotable cover and arranged to apply a hold down force on an associated battery mounted in the compartment, the hold down force applied in a direction away from the pivotable cover and into the compartment toward the associated battery.

2. The battery mounting arrangement of claim 1 further comprising a set plate mounting arrangement, the set plate mounting arrangement including:
   the set plate applying the hold down force to an upper surface of the associated battery;
   at least one pin member having a first end fixedly secured to the cover and a second end slidably received through an aperture in the set plate allowing sliding movement of the set plate relative to the second end of the at least one in member; and
   at least one spring interposed between the set plate and the cover to urge the set plate away from the cover and toward the second end of the at least one pin member.

3. The battery mounting arrangement of claim 2 wherein each at least one pin member is a bolt, the first end of the bolt is threaddedly secured to the cover and the second end of the bolt has a bolt head that limits slidable movement of the set plate.

4. The battery mounting arrangement of claim 3 wherein the spring is a coil spring radially received around the bolt between the first and second ends.

5. The battery mounting arrangement of claim 2 wherein the at least one pin member includes first and second pin members disposed at opposite sides of the associated battery and the at least one spring includes a first spring and a second spring, the first spring radially received around the first pin member and the second spring radially received around the second spring.

6. The battery mounting arrangement of claim 1 wherein the compartment is an engine compartment and the cover is a hood movable between a closed position and an open position wherein access is provided to the engine compartment, the spring mounted set plate applies the hold down force to the associated battery when the hood is in the closed position to secure the battery within the engine compartment, the spring mounted set plate moved apart from the associated battery when the hood is in the open position allowing the associated battery to be removed from the engine compartment.

7. The battery mounting arrangement of claim 1 further including:
   a movement control apparatus that limits at least one of longitudinal or lateral movement of the associated battery within the compartment.

8. The battery mounting arrangement of claim 7 wherein the movement control apparatus is a battery tray that limits both longitudinal and lateral movement of the associated battery within the compartment.

9. The battery mounting arrangement of claim 8 wherein the battery tray includes at least one upstanding lateral wall for limiting lateral movement of the associated battery and at least one upstanding longitudinal wall for limiting longitudinal movement of the associated battery.

10. The battery mounting arrangement of claim 9 wherein the battery tray is formed as a lower clamshell housing portion having a base wall upon which the associated battery rests when installed in the compartment, a pair of spaced apart lateral walls and a pair of spaced apart longitudinal walls, the lateral and longitudinal walls complementing a shape of the associated battery.

11. The battery mounting arrangement of claim 10 further including:
   an upper clamshell housing portion received over an upper portion of the associated battery, the upper clamshell housing portion having an upper wall received over an upper side of the associated battery, a pair of spaced apart lateral walls and a pair of spaced apart longitudinal walls, the lateral and longitudinal walls of the upper clamshell housing portion complementing a shape of the associated battery, the upper and lower clamshell housing portions together forming a battery housing that encases the associated battery, wherein the upper wall of the upper clamshell housing portion includes apertures through which terminals of the battery extend.

12. A battery mounting assembly for securing a battery within an engine compartment of a vehicle, comprising:
   a vehicle body portion for supporting the battery within the engine compartment;
   a hood disposed over the engine compartment, the hood movable between a closed position wherein the hood closes the engine compartment and an open position wherein access is provided to the engine compartment; and
   a set plate mounted to the hood on an underside thereof, the set plate urged toward an extended position wherein the set plate applies a hold down force to the battery to secure the battery to the vehicle body portion when the hood is in the closed position.

13. The battery mounting assembly of claim 12 further including:
   a pair of pin members securing the set plate to the hood, the set plate movable along the pin members between the extended position and a retracted position;
   at least one spring interposed between the set plate and the hood for urging the set plate toward the extended position along the pins.

14. The battery mounting assembly of claim 13 wherein the at least one spring includes a first coil spring annularly disposed on a first one of the pair of pin members and a second coil spring annularly disposed on a second one of the pair of pin members.

15. The battery mounting assembly of claim 13 wherein each of the pair of pin members is a shoulder bolt having a head portion and a threaded portion, the head portion prevents the set plate from being removed from the pair of pin members and the threaded portion is received in a fastener secured to the hood.

16. The battery mounting assembly of claim 12 further including:
   a battery tray mounted to the vehicle body portion for receiving the battery, the battery tray having lateral and longitudinal walls for limiting lateral and longitudinal movement of the battery within the engine compartment.

17. The battery mounting assembly of claim 16 wherein the battery tray is a lower clamshell housing portion enclosing a lower portion of the battery and the battery mounting assembly further includes:
   an upper clamshell housing portion enclosing an upper portion of the battery, the upper and lower clamshell housing portions together enclosing the battery.

* * * * *